US010299158B2

United States Patent
Patil et al.

(10) Patent No.: US 10,299,158 B2
(45) Date of Patent: May 21, 2019

(54) VEHICLE-TO-VEHICLE (V2V) SENSOR SHARING

(71) Applicant: QUALCOMM Incorporated, San Diego, CA (US)

(72) Inventors: Shailesh Patil, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 15/665,984

(22) Filed: Aug. 1, 2017

(65) Prior Publication Data

US 2018/0160333 A1 Jun. 7, 2018

Related U.S. Application Data

(60) Provisional application No. 62/429,537, filed on Dec. 2, 2016.

(51) Int. Cl.
*H04W 28/02* (2009.01)
*H04L 29/08* (2006.01)
(Continued)

(52) U.S. Cl.
CPC ........ *H04W 28/0236* (2013.01); *G08G 1/162* (2013.01); *G08G 1/166* (2013.01);
(Continued)

(58) Field of Classification Search
CPC ... H04W 28/0236; H04W 4/046; H04W 4/46; H04W 84/18; H04W 84/12; H04W 88/08; H04W 80/04; H04W 88/06; H04W 8/26; H04W 24/00; H04L 67/12; H04L 2012/5608; H04L 43/08; H04L 43/50;
(Continued)

(56) References Cited

U.S. PATENT DOCUMENTS

2008/0114531 A1 * 5/2008 Kagawa ................. G08G 1/163
701/119

FOREIGN PATENT DOCUMENTS

JP 2016018407 A 2/2016
WO WO-2011089641 A1 7/2011

OTHER PUBLICATIONS

International Search Report and Written Opinion—PCT/US2017/060369—ISA/EPO—dated May 3, 2018.
(Continued)

*Primary Examiner* — Brenda H Pham
(74) *Attorney, Agent, or Firm* — Haynes and Boone, LLP (36340) IP Section (57) ABSTRACT

Wireless communications systems and methods related to sharing of sensor data among vehicles are provided. A first vehicle receives, from a second vehicle, first sensing information associated with a first object. The first vehicle detects sensor data associated with a second object. The first vehicle transmits second sensing information associated with the second object based on at least the sensor data, the first sensing information, and a transmission latency budget for the second sensing information. The first sensing information includes geographical location information of the first object. The second sensing information includes geographical location information of the second object. Other aspects, embodiments, and features are also claimed and described.

30 Claims, 7 Drawing Sheets

(51) Int. Cl.
  *H04W 4/04* (2009.01)
  *G08G 1/16* (2006.01)
  *H04W 4/46* (2018.01)
  *H04W 74/08* (2009.01)

(52) U.S. Cl.
  CPC ............. *H04L 67/12* (2013.01); *H04W 4/046* (2013.01); *H04W 4/46* (2018.02); *G08G 1/161* (2013.01); *H04W 74/0816* (2013.01)

(58) Field of Classification Search
  CPC .... H04L 43/0852; G08G 1/162; G08G 1/166; G08G 1/161; H04B 17/003
  USPC ............... 370/310.252, 310.2, 328, 338, 349
  See application file for complete search history.

(56) References Cited

OTHER PUBLICATIONS

Partial International Search Report—PCT/US2017/060369—ISA/EPO—dated Mar. 2, 2018.

\* cited by examiner

VEHICLE-TO-VEHICLE (V2V) SENSOR SHARING

CROSS REFERENCE TO RELATED APPLICATIONS

The present application claims priority to and the benefit of the U.S. Provisional Patent Application No. 62/429,537, filed Dec. 2, 2016, which is hereby incorporated by reference in its entirety as if fully set forth below and for all applicable purposes.

TECHNICAL FIELD

The technology discussed in this disclosure relates generally relates to vehicle-to-vehicle (V2V) communications, and more particularly to sharing sensor data related to pedestrians, obstacles, and/or vehicles on the roads. Embodiments enable and provide solutions and techniques allowing vehicles to share sensor data with each other without overloading or flooding a network by considering sensor data transmission latency budget.

INTRODUCTION

Self-driving vehicles may include advanced sensors and internal computer systems designed to monitor and control vehicle operations and driving functions. One approach to assist self-driving vehicles is to communicate with other vehicles travelling on the same roadways. Typical sensors used by self-driving vehicles may include Lidar detectors, radar detectors, and/or cameras, which are line-of-sight (LOS) sensors. Vehicle-to-vehicle (V2V) communications can occur over LOS channels and/or non-line-of-sight (NLOS) channels.

V2V communications can be particularly helpful in cases where two vehicles approach an intersection (e.g., a NLOS condition). Vehicles can share sensor information with each other via V2V communications. For a particular location or geographical area, there may be several vehicles sensing the same information such as an obstacle or a pedestrian. If all vehicles broadcast this information, bandwidth and/or data rate usages may be significantly increased.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description presented later.

While vehicles may share sensor data with each other using broadcast, improved procedures for sharing sensor data with more efficient bandwidth utilization may be desirable. Embodiments of the present disclosure provide mechanisms for vehicles or devices to efficiently share sensing information with each other. The sharing may be based on a transmission latency budget for a given observed object (e.g., a pedestrian or another vehicle). The use of a transmission latency budget may avoid multiple vehicles or devices sending the same sensing information.

For example, in an aspect of the disclosure, a method of wireless communication, includes receiving, by a first vehicle from a second vehicle, first sensing information associated with a first object; detecting, by the first vehicle, sensor data associated with a second object; and transmitting, by the first vehicle, second sensing information associated with the second object based on at least the sensor data, the first sensing information, and a transmission latency budget for the second sensing information.

In an additional aspect of the disclosure, an apparatus associated with a first vehicle, includes a receiver configured to receive, from a second vehicle, first sensing information associated with a first object; a sensor configured to detect sensor data associated with a second object; and a transmitter configured to transmit second sensing information associated with the second object based on at least the sensor data, the first sensing information, and a transmission latency budget for the second sensing information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments. Such exemplary embodiments can be implemented in various devices, systems, and methods.

DETAILED DESCRIPTION

The detailed description set forth below, about the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form to avoid obscuring such concepts.

The techniques described herein may employ various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

The present disclosure describes mechanisms for sharing sensor data among wireless sensor nodes. For example, a vehicle may be equipped with sensors and wireless communication device. The vehicle may sense surrounding objects and associate a transmission latency budget with each sensor data sensed by the vehicle. Examples of surrounding objects may include pedestrians, obstacles, and/or vehicles on a roadway. The vehicle may also listen to a channel for sensor data transmitted by other vehicles travelling on the same roadway. The channel may include time-frequency resources. When a vehicle senses an observed object and receives sensor data about the same object within a transmission latency budget of the observed object, the vehicle may refrain from transmitting the same information in the network. Otherwise, the vehicle may contend for channel resources and transmit sensing information about the observed object. In some embodiments, the vehicle may determine a transmission probability or a back-off time duration based on the transmission latency budget. In some embodiments, a network may allow for a maximum number of transmissions of sensing information about the same object to increase security and/or reliability. In some embodiments, a network may associate channel resources with locations of observed objects. The disclosed embodiments may employ a combination of long-range and short-range wireless technologies for V2V and/or vehicle-to-infrastructure (V2I) communications. While the disclosed embodiments are described in the context of sharing sensor data among vehicles, the disclosed embodiments can be applied to air borne drones, autonomous robots, industrial applications, cars, boats, planes, and/or any devices with sensors.

Aspects of the present application can provide several benefits. For example, while vehicles may be equipped with sensors to detect objects on the roads, these sensors may have limited range in terms of both distance and direction(s) of detection. The disclosed embodiments enable vehicles to detect an obstacle and communicate the detection to other vehicles that may not be able to observe the pedestrian or the obstacle directly (e.g., due to the range limits of the sensor(s), being blocked by other obstructions or vehicles, etc.). This information can be used by the vehicle receiving the communication to adjust its speed, direction, or other driving parameter based on the detected obstacle. In this manner, vehicles can be controlled to avoid obstacles that the vehicle itself may not be able to detect. To this end, the disclosed embodiments also provide transmission schemes that allow for efficient sharing of sensor data between vehicles. In addition, the disclosed embodiments provide efficient resource-to-location mapping schemes that can reduce the transmission latency for timing-critical sensor data.

Figure 1:
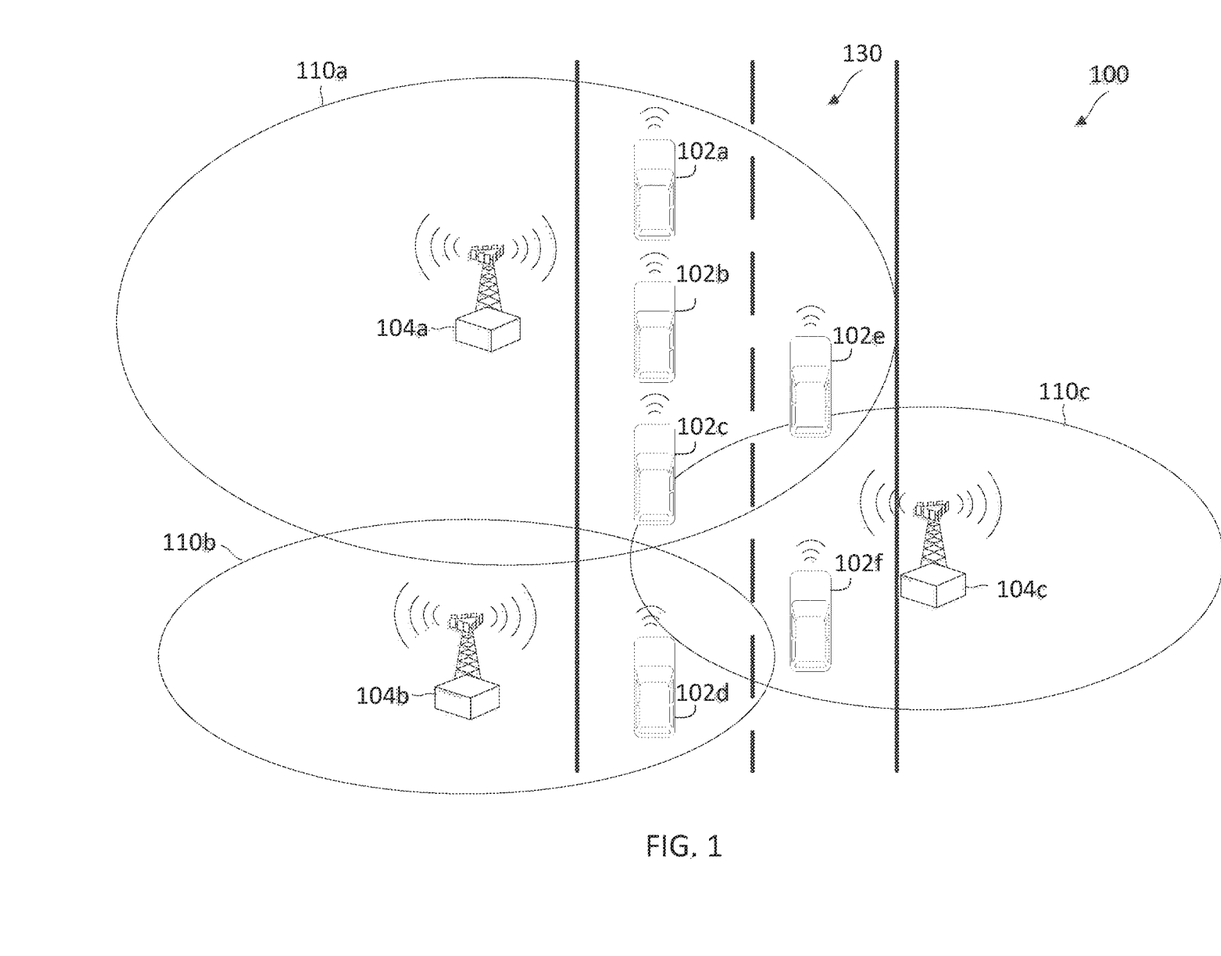
FIG. 1 illustrates a wireless communication network that facilitates vehicle-to-vehicle (V2V) communications according to embodiments of the present disclosure.

FIG. 1 illustrates a wireless communication network 100 that facilitates V2V communications according to embodiments of the present disclosure. The network 100 may include a number of vehicles 102 and a number of BSs 104. The BSs 104 may include an Evolve Node B (eNodeB) or a next Generation Node B (gNB). A BS 104 may be a station that communicates with the vehicles 102 and may also be referred to as a base transceiver station, a node B, an access point, and the like.

The BSs 104 communicate with the vehicles 102. A vehicle 102 may communicate with the BS 104 via an uplink (UL) and a downlink (DL). The downlink (or forward link) refers to the communication link from the BS 104 to the vehicle 102. The UL (or reverse link) refers to the communication link from the vehicle 102 to the BS 104. The BSs 104 may also communicate with one another, directly or indirectly, over wired and/or wireless connections.

The vehicles 102 may be travelling on a roadway 130. The vehicles 102 may travel through different coverage areas or cells 110 in the network 100. The vehicles 102 may have in-vehicle wireless communication devices for communicating with each other and with the BSs 104. The vehicles 102 may have receivers for communication with a global navigation satellite system (GNSS), which may provide accurate location tracking and timing information. The vehicles 102 may have sensors for various sensing, which may be for navigational, safety, and/or performance. Some examples of sensors may include Lidars, radars, and high-definition cameras. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell with varying coverage areas and access restrictions. As shown, the BSs 104a, 104b, and 104c provide communication coverage in the cells 110a, 110b, and 110c, respectively. In some embodiments, a BS 104 may support one or multiple (e.g., two, three, four, and the like) cells.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, communications in the network 100 may be performed in the form of radio frames. A radio frame may include a plurality of subframes. Each subframe may include a plurality of symbols spanning a frequency band and a time interval. The network 100 may employ various transmission configurations. For example, each radio frame may include one or more subframes for DL transmissions and one or more subframes for UL transmissions.

In the network 100, the vehicles 102 may employ various wireless communication technologies. In some embodiments, the network 100 may support LTE-based V2V, LTE-based V2I, LTE-based device-to-device (D2D), or direct short range communication (DSRC) communications. In an embodiment, the vehicles 102 may share sensing information with each other. For example, a vehicle 102c may detect an object (e.g., a pedestrian or an obstacle) on the roadway 130 via a sensor built into the vehicle 102c. The vehicle 102c may broadcast sensing information associated with the detected object using V2V communication. The vehicle 102c may determine whether to broadcast the sensing information based on sensing information received from surrounding vehicles 102a, 102b, 102e, 102d, and/or 102f, as described in greater detail herein. When the vehicles 102 travel into a coverage area or a cell 110, the vehicles 102 may communicate with a corresponding BS 104 and may utilize services (e.g., resource scheduling and/or sensor sharing configurations) provided by the BS 104.

Although not shown, the network 100 may further include a number of user equipments (UEs) in communication with the BSs 104. A UE may be a cellular phone, a smartphone, a personal digital assistant, a wireless modem, a laptop computer, a tablet computer, etc. In some embodiments, the UEs and the vehicles 102 may employ a similar initial attachment procedure to communicate initiate communication with the BSs 104. For example, the initial attachment procedure may be similar to the LTE random access procedure.

Figure 2:
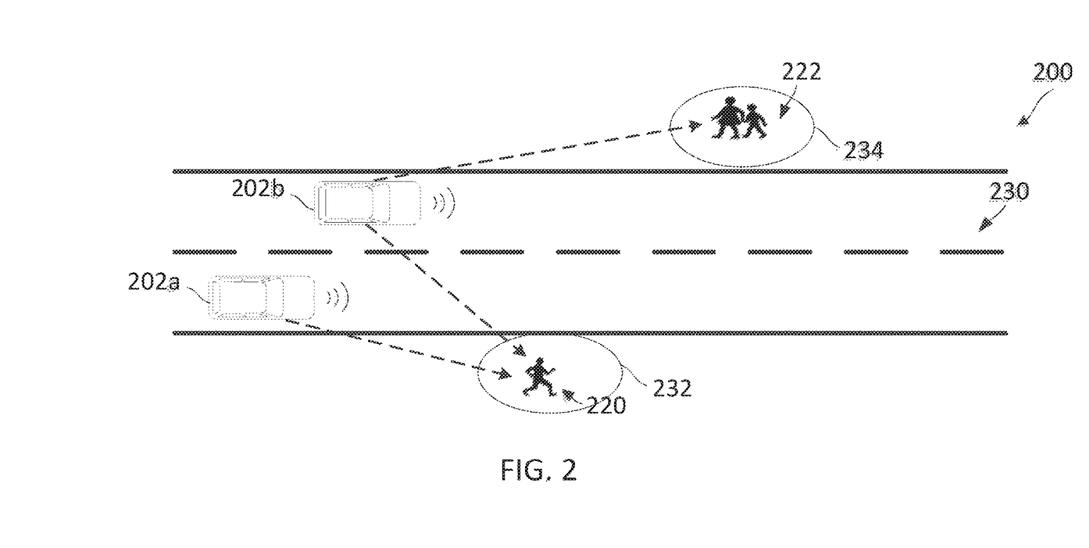
FIG. 2 illustrates a V2V sensor data sharing scenario according to embodiments of the present disclosure.
Figure 3:
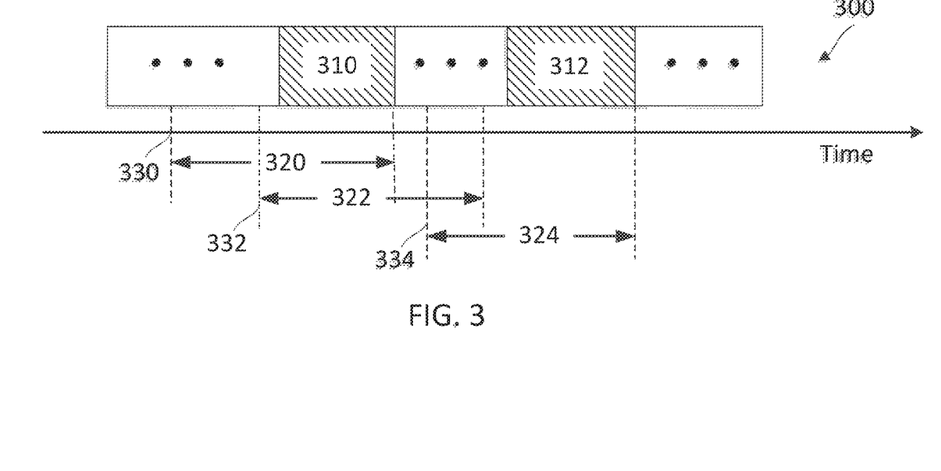
FIG. 3 illustrates a V2V sensor data sharing scheme according to embodiments of the present disclosure.

FIGS. 2 and 3 illustrate V2V sensor data sharing in a network similar to the network 100. FIG. 2 illustrates a V2V sensor data sharing scenario 200 according to embodiments of the present disclosure. FIG. 2 illustrates two vehicles 202 for purposes of simplicity of discussion, though it will be recognized that embodiments of the present disclosure may scale to many more vehicles 202. The vehicles 202a and 202b are similar to the vehicles 102. FIG. 3 illustrates a V2V sensor data sharing scheme 300 according to embodiments of the present disclosure. In FIG. 3, the x-axis represents time in some constant units.

In the scenario 200, the vehicle 202a and the vehicle 202b travel on the same roadway 230. At time 330, the vehicle 202a senses or observes a pedestrian 220 running at a location 232. The vehicle 202a determines a transmission latency budget 320 for the pedestrian 220 and transmits sensing information 310 associated with the pedestrian 220 at the end of the transmission latency budget 320.

The transmission latency budget 320 may vary depending on the embodiments. In some embodiments, the vehicle 202a may dynamically determine the transmission latency budget 320, for example, based on a speed of the observed object (e.g., the pedestrian 220), the type of the observed object, surrounding environment and/or events, operational characteristics of the vehicle 202a, and/or any suitable factor. Examples of surrounding environment may include daylight, snow, rain, temperature, and windy conditions. The vehicle may also include pre-provisional information and/or rules in the determination of the transmission latency budget 320. In some embodiments, the vehicle 202a may determine the transmission latency budget 320 statically, for example, based on some predetermined values. In some embodiments, the vehicle 202a may determine transmission latency budget 320 using a combination of dynamic events and static information. In some embodiments, the transmission latency budget 320 may be about 100 milliseconds (ms) long so that the sensing information 310 may be within a certain limit of accuracies.

The sensing information 310 may include geographical location and/or speed information about the pedestrian 220. In some embodiments, the vehicle 202a may receive sensor data (e.g., images) about the pedestrian 220 and may process the sensor data to produce sensing information suitable for sharing with other vehicles.

At time 332, the vehicle 202b also senses or observes the same pedestrian 220 at the location 232. Similarly, the vehicle 202b determines a transmission latency budget 322 for the pedestrian 220. Since the vehicle 202b receives the sensing information 310 about the pedestrian 220 within the transmission latency budget 322, the vehicle 202b may avoid transmitting the same information about the pedestrian 220.

At time 334, the vehicle 202b senses or observes pedestrians 222 walking at a location 234. The vehicle 202b determines a transmission latency budget 324 for the pedestrians 222. Since the vehicle 202b did not receive any information about the pedestrians 222 within the transmission latency budget 324, the vehicle 202b transmits sensing information 312 associated with the pedestrians 222 at the end of the transmission latency budget 324. Similarly, the sensing information 312 may include geographical location and/or speed information about the pedestrians 222.

Transmission latency budget determination may have varying characteristics and may be based on a variety of criteria. In some scenarios, the transmission latency budgets 320, 322, and 324 may have the same duration or different durations. In some embodiments, the transmission latency budgets 320 and 322 may be dependent on the velocity of the running pedestrian 220 and the transmission latency budget 324 may be dependent on the velocity of the walking pedestrians 222. The scheme 300 avoids repeating transmissions of the same sensing information, and thus may reduce network traffic. The reduction in network traffic may improve sensor data sharing range. In addition, the scheme 300 accounts for the mobility of slow-motion objects (e.g., the pedestrians 220 and 222) by limiting transmission latency budgets (e.g., the transmission latency budgets 320, 322, and 324) based on the velocities of the slow-motion objects. As such, the scheme 300 allows for in-time sharing of sensor data, and thus may facilitate road safety.

The vehicles 202a and 202b may employ listen-before-talk (LBT) mechanisms to contend for channel resources for transmitting the sensing information 310 and 312, respectively, as described in greater detail herein. In some embodiments, when the vehicles 202 travel in a coverage area of a BS such as the BSs 104, the vehicles 202 may receive configuration information for transmitting sensing information. The configuration information may indicate resources for transmitting sensor data related to observed objects and rules related to sensor data transmission (e.g., a maximum allowable number of transmissions indicating the same object), as described in greater detail herein. Although the scheme 300 is described in the context of sharing information about pedestrians, the scheme 300 may be applied to share information about any surrounding objects, such as vehicles and obstacles.

Figure 4:
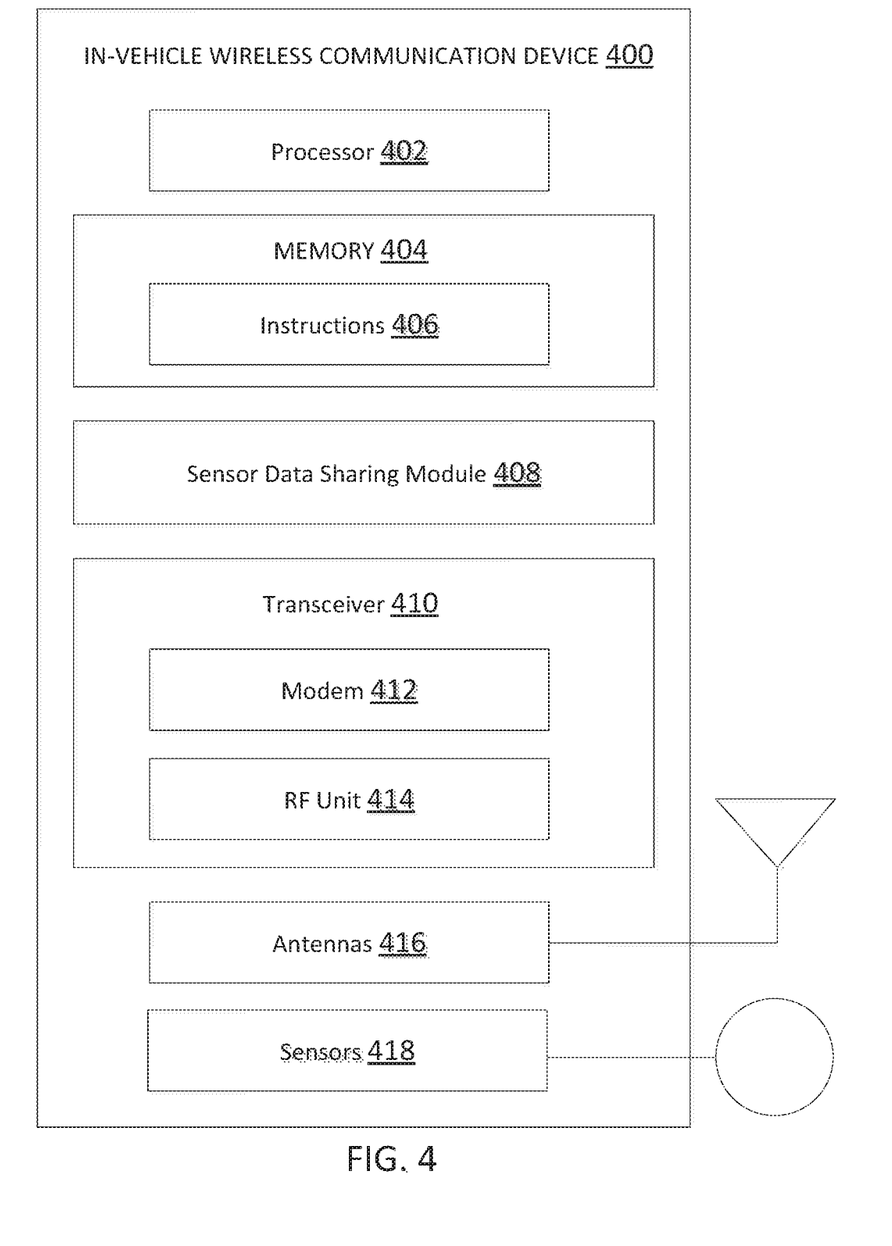
FIG. 4 is a block diagram of an exemplary in-vehicle wireless communication device according to embodiments of the present disclosure.

FIG. 4 is a block diagram of an exemplary in-vehicle wireless communication device 400 according to embodiments of the present disclosure. The in-vehicle wireless communication device 400 may be located in the vehicles 102 as discussed above. As shown, the in-vehicle wireless communication device 400 may include a processor 402, a memory 404, a sensor data sharing module 408, a transceiver 410 including a modem subsystem 412 and a radio frequency (RF) unit 414, an antenna 416, and one or more sensors 418 (e.g., Lidar detectors, radar detectors, and/or high-definition cameras). These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the vehicles 102 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sensor data sharing module 408 may be implemented via hardware, software, or combinations thereof. For example, the sensor data sharing module 408 may be implemented as a processor, circuit, and/or instructions 406 stored in the memory 404 and executed by the processor 402. The sensor data sharing module 408 may be used for various aspects of the present disclosure. For example, the sensor data sharing module 408 is configured to receive sensor data associated with surrounding objects, such as the pedestrians 220 and 222, obstacles, or other vehicles 102, from the sensors 418, determine transmission latency budgets for the observed objects, and transmit sensing information associated with the observed objects based on some pre-determine rules, as described in greater detail herein.

As shown, the transceiver 410 may include the modem subsystem 412 and the RF unit 414. The transceiver 410 can be configured to communicate bi-directionally with other devices, such as the BSs 104. The modem subsystem 412 may be configured to modulate and/or encode the data from the memory 404 and/or the sensor data sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a vehicle 102 or a BS 104. The RF unit 414 may be further configured to perform analog beamforming in conjunction with the digital beamforming. Although shown as integrated together in transceiver 410, the modem subsystem 412 and the RF unit 414 may be separate devices that are coupled together at the vehicle 102 to enable the vehicle 102 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of channel reservation signals to contend for channel resources and sensing information associated with observed objects according to embodiments of the present disclosure. The antenna 416 may further receive data messages transmitted from other devices. This may include, for example, reception of a transmission grant or messages from other vehicles 102 according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416

Figure 5:
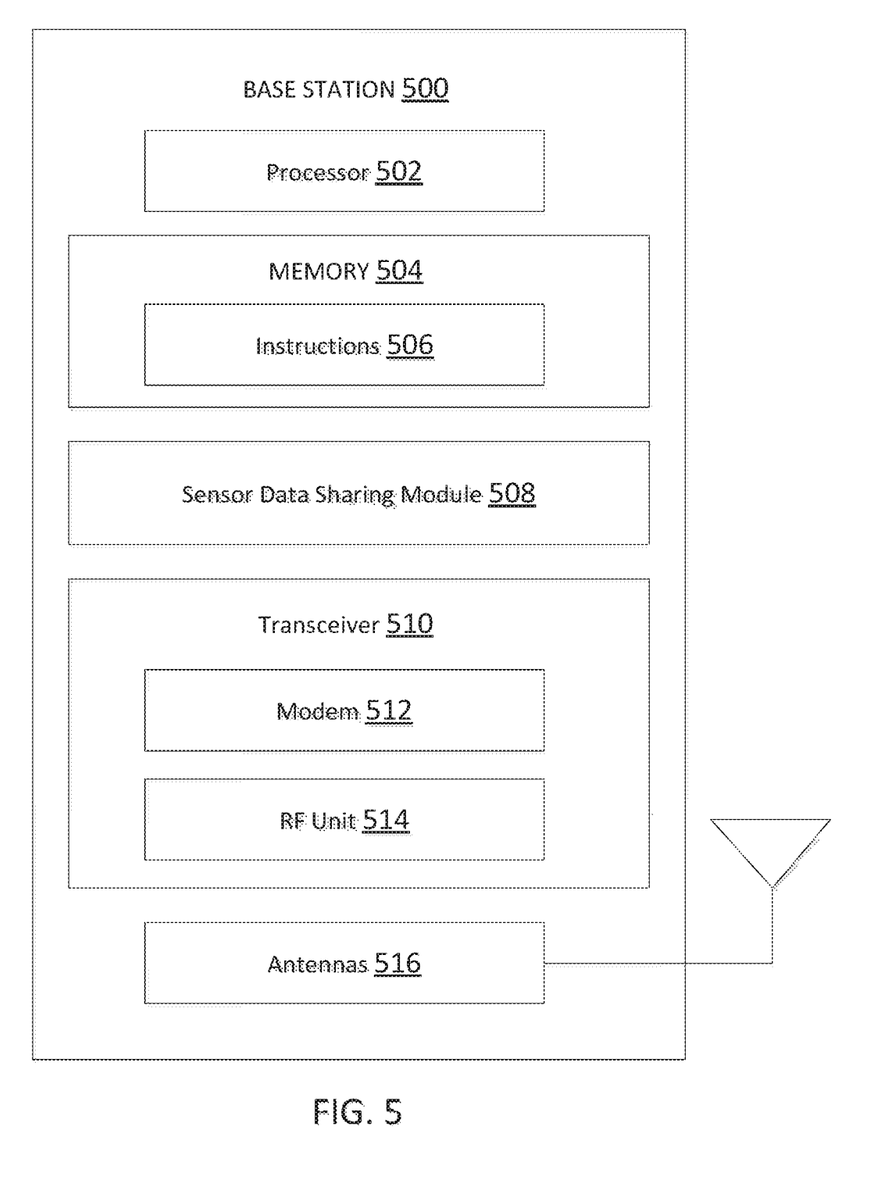
FIG. 5 illustrates a block diagram of an exemplary base station (BS) according to embodiments of the present disclosure.

FIG. 5 illustrates a block diagram of an exemplary BS 500 according to embodiments of the present disclosure. The BS 500 may be a BS 104 as discussed above. A shown, the BS 500 may include a processor 502, a memory 504, a sensor data sharing module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

The sensor data sharing module 508 may be used for various aspects of the present disclosure. For example, the sensor data sharing module 508 is configured to determine and transmit configurations for sensor data sharing in the network, as described in greater detail herein.

As shown, the transceiver 510 may include the modem subsystem 512 and the RF unit 514. The transceiver 510 can be configured to communicate bi-directionally with other devices, such as the vehicles 102 and 202 and the wireless communication device 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a vehicle 102. Although shown as integrated together in transceiver 510, the modem subsystem 512 and the RF unit 514 may be separate devices that are coupled together at the BS 104 to enable the BS 104 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped vehicle 102 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
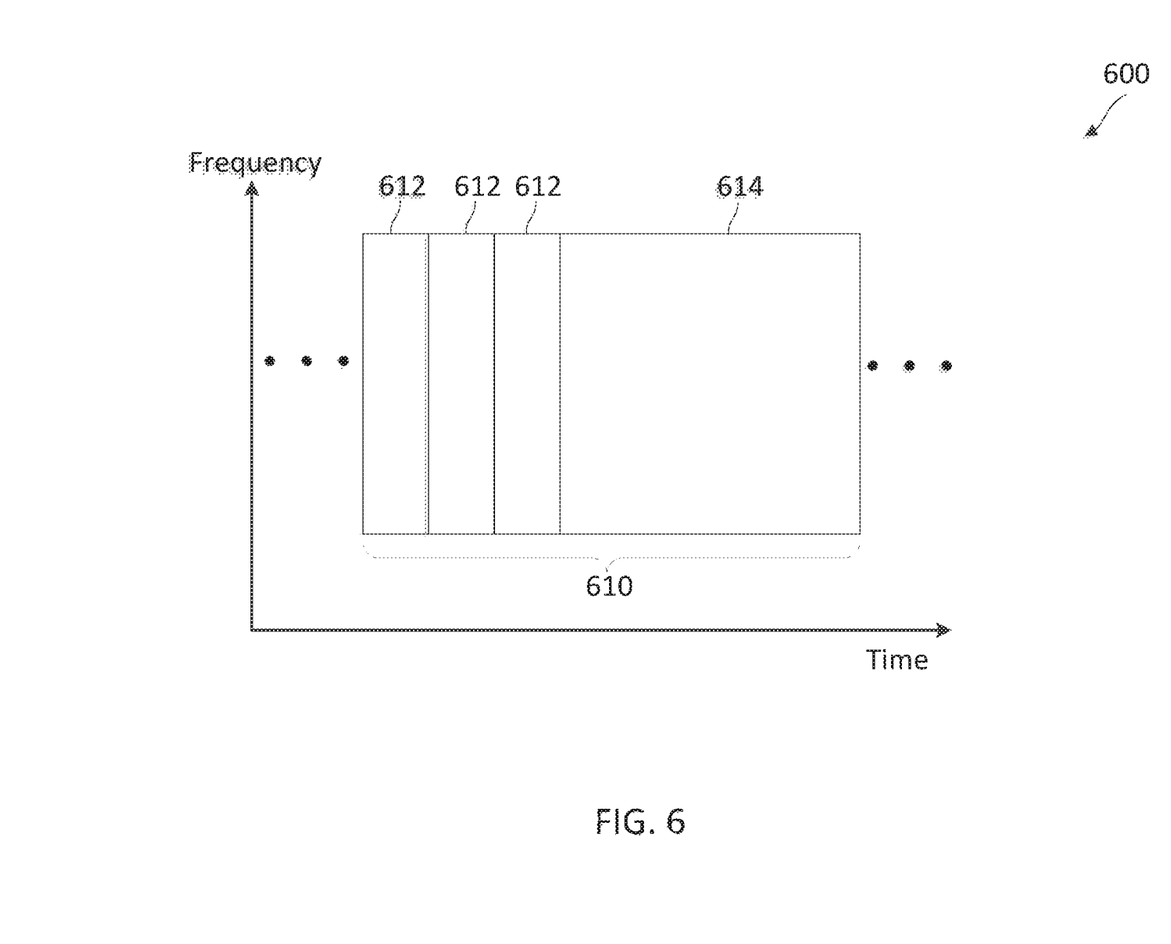
FIG. 6 illustrates a listen-based V2V sensor data transmission scheme according to embodiments of the present disclosure.

FIG. 6 illustrates a listen-based V2V sensor data transmission scheme 600 according to embodiments of the present disclosure. The scheme 600 may be employed by the vehicles 102 and 202 to transmit sensing information (e.g., the sensing information 310 and 312). In FIG. 6, the x-axis represents time in some constant units and the y-axis represents frequency in some constant units. In the scheme 600, a channel is divided into subframes 610. Each subframe 610 includes a plurality of channel clear assessment (CCA) slots 612 and a transmission slot 614. Each CCA slot 612 may include one or more symbols. The transmission slot 614 may include a greater number of symbols than the CCA slots 612. A vehicle contending for the transmission slot 614 may transmit a channel reservation request signal in one of the CCA slots 612. Other vehicles may listen to the channel during the CCA slots 612. Upon detecting the channel reservation request signal, the other vehicles may refrain from transmitting in the transmission slot 614 to avoid collisions. In some embodiments, the channel reservation request signal may be a specific sequence or preamble. Thus, the detection may include monitoring signal energy in the channel and/or detecting the specific sequence or preamble. In some embodiments, the CCA slots 612 may be ordered based on transmission priorities and each CCA slot 612 may be assigned to a particular vehicle or a subset of vehicles for transmitting a channel reservation request signal to reserve the transmission slot 614.

As described above, a vehicle may transmit sensing information about an observed object (e.g., the pedestrians 220 and 222) at the end of a transmission latency budget (e.g., the transmission latency budgets 320, 322, and 324). Instead of having all vehicles to contend for resources at the end of a transmission latency budget, the transmissions of the sensing information may be distributed over time to avoid congestion at a particular time. For example, each vehicle may determine a transmission probability for each sensing information based on a remaining of a transmission latency budget for the sensing information. When the sensing information is initially detected, the transmission probability may be low and the transmission probability may increase as the time approaches the transmission latency budget. For example, the transmission probability may reach a value of 1 at the end of the transmission latency budget. In one embodiment, a vehicle may configure a backoff counter or a backoff time duration for contending for resources to transmit sensor data information as a function of transmission latency budget. For example, the vehicle may configure the backoff counter with a large value when the transmission latency budget is high and a small value when the transmission latency budget is low. Thus, time-critical or urgent sensing information may have a higher transmission priority than less urgent sensing information.

In an embodiment, a network may be configured to allow for N number of transmissions for each observed object in order to increase security or reliability of the sensing information about the observed object, where N is a positive integer. For example, a vehicle may detect an object and determine that the vehicle had received sensing information about the same object. Instead of refraining from transmitting sensing information about the object as in the scheme 300, the vehicle may determine whether a number of receptions of the sensing information is less than a pre-determined number of receptions (e.g., N). When the number of receptions is less than the pre-determined number of receptions, the vehicle may transmit the sensing information about the same object in the network. In some embodiments, the vehicle may receive the configuration parameter N from a BS such as the BSs 104.

Figure 7:
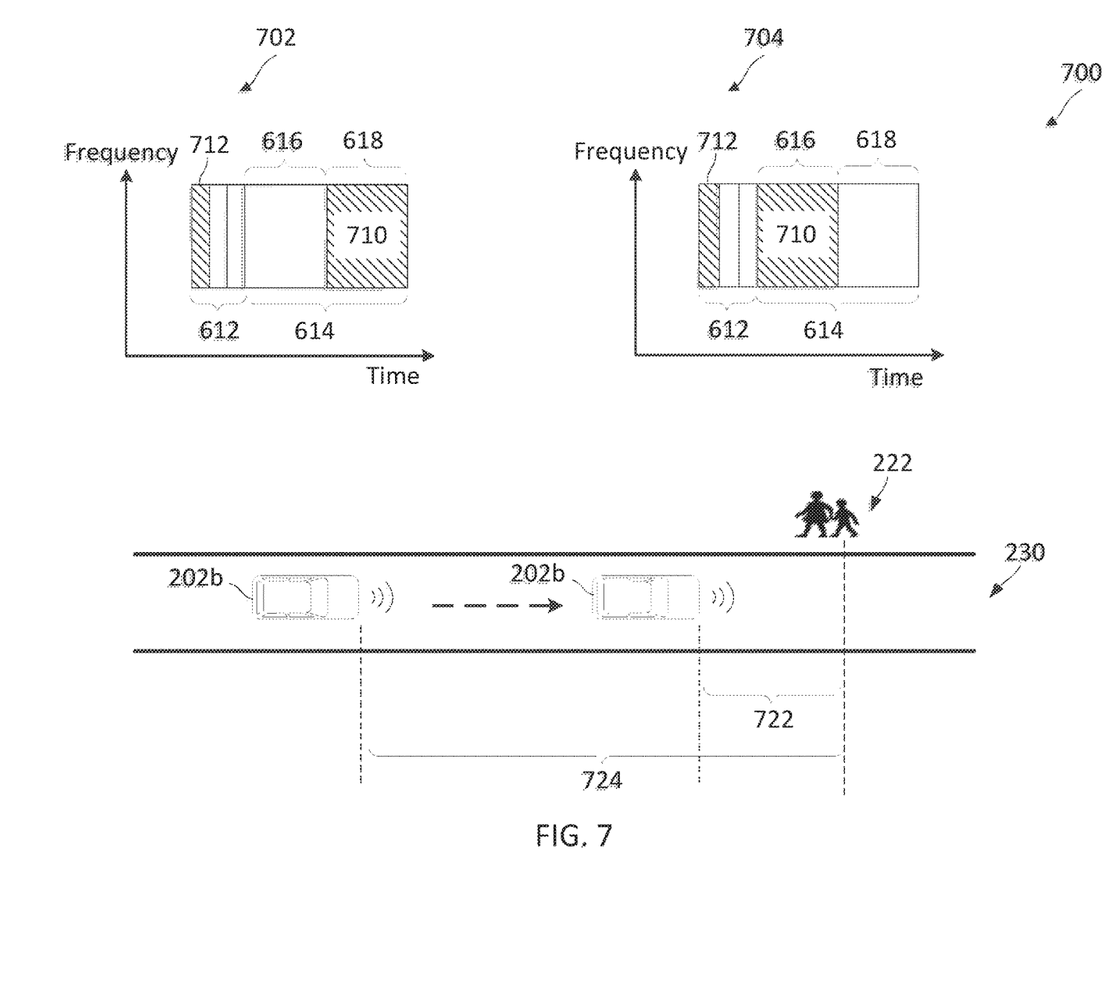
FIG. 7 illustrates a listen-based V2V sensor data transmission scheme according to embodiments of the present disclosure.

FIG. 7 illustrates a listen-based V2V sensor data transmission scheme 700 according to embodiments of the present disclosure. The scheme 700 may be employed by the vehicles 102 and 202 to transmit sensing information (e.g., the sensing information 310 and 312). The scheme 700 is similar to the scheme 600, but additionally associates channel resources with the location of an observed object. In FIG. 7, the x-axis represents time in some constant units and the y-axis represents frequency in some constant units. In the scheme 700, the transmission slot 614 is divided into a first portion 616 and a second portion 618. The first portion 616 may be used for transmitting sensing information about an observed object that is within a first distance 722 (e.g., 10 feet). The second portion 618 may be used for transmitting sensing information about an observed object that is within a second distance 724 (e.g., 10 feet to 20 feet). The first portion 616 and the second portion 618 may be divided into any suitable percentages of the transmission slot 614.

As an example, the vehicle 202b senses or detects the pedestrians 222 on the roadway 230 and determines to transmit sensing information 710 about the pedestrians 220 when the vehicle 202b is about 20 feet (e.g., within the second distance 724) away from the pedestrians 222. Thus, the vehicle 202b may transmit the sensing information 710 in the second portion 618 of the transmission slot 614, for example, after transmitting a reservation signal 712 to reserve the transmission slot 614, as shown by the transmission configuration 702.

Alternatively, the vehicle 202b may determine to transmit the sensing information 710 when the vehicle 202b is about 10 feet (e.g., within the first distance 722) away from the pedestrians 222. Thus, the vehicle 202a may transmit the sensing information 710 in the first portion 616 of the transmission slot 614 as shown by the transmission configuration 704.

The scheme 700 may allow another vehicle to determine whether to process received sensing information before transmitting sensing information about an observed object. As an example, the vehicle 202a may have a sensing capability within a distance of 10 feet away from the vehicle 202a. When the vehicle 202a detects an object (e.g., within a distance of 10 feet), the vehicle 202a is required to process all sensing information (e.g., the sensing information 710) received from the first portion 616 of the transmission slot 614 in order to determine whether the sensing information is associated with the same detected object.

However, the vehicle 202a can delay the processing of sensing information that is received in the second portion 618 of the transmission slot 614 since the sensing information is about an object that is farther than the sensing capability of the vehicle 202a. Thus, the vehicle 202a can transmit sensing information about an observed object before processing the received sensing information.

The processing of the sensing information may involve upper layer (e.g., a medium access control (MAC) layer) processing, which may be time consuming, and thus may delay the transmissions of sensing information observed by a vehicle. In some examples, the transmission latency budget (e.g., the transmission latency budgets 320, 322, and 324) for an observed object may be relatively short, and thus may have a strict latency requirement. Thus, the scheme 700 may reduce transmission latency since a vehicle can share sensor data about an observed object at an earlier time without waiting for the processing of all received sensing information (e.g., received during the second portion 618). In some embodiments, a BS such as the BSs 104 may transmit a resource-to-location mapping configuration to the vehicles. For example, the resource-to-location mapping configuration may indicate a number of symbols, duration, and/or distance limit for each of the first portion 616 and the second portion 618. In some embodiments, the transmission slot 614 can be divided into three or four or any suitable number of portions for transmitting sensing information about objects at different distance ranges.

Figure 8:
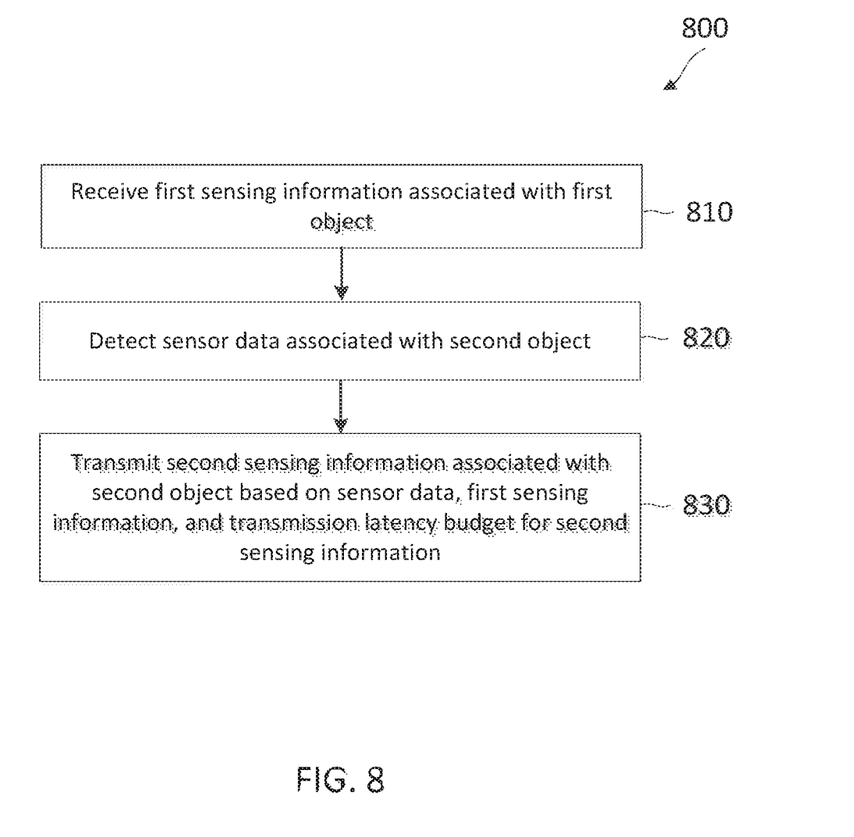
FIG. 8 is a flow diagram of a method of sharing sensor data according to embodiments of the present disclosure.

FIG. 8 is a flow diagram of a method 800 of sharing sensor data according to embodiments of the present disclosure. Steps of the method 800 can be executed by a computing device (e.g., a processor, processing circuit, and/or other suitable component) of a wireless communication device, such as the vehicles 102 and 202 and the in-vehicle wireless communication device 400. The method 800 may employ similar mechanisms as in the schemes 300, 600, and 700 described with respect to FIGS. 3, 6, and 7, respectively. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method 800 includes receiving, by a first vehicle from a second vehicle, first sensing information (e.g., the sensing information 310, 312, and 710) associated with a first object (e.g., the pedestrians 220 and 222, obstacles, or another vehicle).

At step 820, the method 800 includes detecting, by the first vehicle, sensor data associated with a second object.

At step 830, the method 800 includes transmitting, by the first vehicle, second sensing information associated with the second object based on at least the sensor data, the first sensing information, and a transmission latency budget (e.g., the transmission latency budget 320, 322, and 324) for the second sensing information. The transmission of the second sensing information may include contending for channel resources as described in the scheme 600 and transmitting on the resources according to a resource-to-location mapping as described in the scheme 700. In some embodiments, the transmission of the second sensing information may be a broadcast transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, comprising receiving, by a first vehicle from a second vehicle, first sensing information associated with a first object; detecting, by the first vehicle, sensor data associated with a second object; and transmitting, by the first vehicle, second sensing information associated with the second object based on at least the sensor data, the first sensing information, and a transmission latency budget for the second sensing information.

The method further includes wherein the first sensing information includes geographical location information of the first object, and wherein the second sensing information includes geographical location information of the second object. The method further includes wherein the transmission latency budget is based on at least a speed of the second object. The method further includes wherein second sensing information is transmitted as a broadcast transmission. The method further comprising determining, by the first vehicle, that the second object is different than the first object. The method further comprising determining, by the first vehicle, that the first object is the same as the second object; and determining, by the first vehicle, whether a number of receptions of the first sensing information associated with the first object is less than a pre-determined number of receptions, wherein the second sensing information is transmitted when the number of receptions of the first sensing information is determined to be less than the pre-determined number of receptions. The method further comprising receiving, by the first vehicle, a configuration indicating the pre-determined number of receptions. The method further comprising contending for a resource in a channel for transmitting the second sensing information. The method further includes wherein the contending is based on a remaining time of the transmission latency budget. The method further includes wherein the contending includes determining a backoff time duration based on the transmission latency budget. The method further includes wherein the contending includes transmitting a channel reservation request signal in a first time interval of a subframe to reserve a second time interval of the subframe for transmission of the second sensing information. The method further includes wherein the first sensing information is received in a first portion of a subframe, wherein the first portion is associated with a first distance to the first object, wherein the method further comprises processing, by the first vehicle, the first sensing information, and wherein the second sensing information is transmitted based on the processing. The method further comprising receiving, by the first vehicle in a second portion of the subframe, third sensing information associated with a third object, wherein the second portion is associated with a second distance to the third object, wherein the second distance is farther than the first distance, and wherein the second sensing information is transmitted before processing the third sensing information. The method further comprising receiving, by the first vehicle, a configuration indicating resource-to-location mapping information associated with the first portion and the second portion of the subframe. The method further includes wherein the detecting includes sensing, by a sensor of the first vehicle, the sensor data associated with the second object. The method further includes wherein the sensor includes at least one of a Lidar detector, a radar detector, or a camera.

Embodiments of the present disclosure include an apparatus associated with a first vehicle, comprising a receiver configured to receive, from a second vehicle, first sensing information associated with a first object; a sensor configured to detect sensor data associated with a second object; and a transmitter configured to transmit second sensing information associated with the second object based on at least the sensor data, the first sensing information, and a transmission latency budget for the second sensing information.

The apparatus further includes wherein the first sensing information includes geographical location information of the first object, and wherein the second sensing information includes geographical location information of the second object. The apparatus further includes wherein the transmission latency budget is based on at least a speed of the second object. The apparatus further includes wherein second sensing information is transmitted as a broadcast transmission. The apparatus further comprising a processor configured to determine that the second object is different than the first object. The apparatus further comprising a processor configured to determine that the first object is the same as the second object; and determine whether a number of receptions of the first sensing information associated with the first object is less than a pre-determined number of receptions, and wherein the second sensing information is transmitted when the number of receptions of the first sensing information is determined to be less than the pre-determined number of receptions. The apparatus further includes wherein the receiver is further configured to receive a configuration indicating the pre-determined number of receptions. The apparatus further comprising a processor configured to contend for a resource in a channel for transmitting the second sensing information. The apparatus further includes wherein the processor is further configured to contend for the resource based on a remaining time of the transmission latency budget. The apparatus further includes wherein the processor is further configured to contend for the resource by determining a backoff time duration based on the transmission latency budget. The apparatus further includes wherein the processor is further configured to contend for the resource by transmitting, via the transmitter, a channel reservation request signal in a first time interval of a subframe to reserve a second time interval of the subframe for transmission of the second sensing information. The apparatus further includes wherein the first sensing information is received in a first portion of a subframe, wherein the first portion is associated with a first distance to the first object, wherein the apparatus further comprises a processor further configured to process the first sensing information, and wherein the second sensing information is transmitted based on the processing. The apparatus further includes wherein the receiver is further configured to receive, in a second portion of the subframe, third sensing information associated with a third object, wherein the second portion is associated with a second distance to the third object, wherein the second distance is farther than the first distance, and wherein the second sensing information is transmitted before processing the third sensing information. The apparatus further includes wherein the receiver is further configured to receive a configuration indicating resource-to-location mapping information associated with the first portion and the second portion of the subframe. The apparatus further includes wherein the sensor includes at least one of a Lidar detector, a radar detector, or a camera.

Embodiments of the present disclosure include a computer-readable medium having program code recorded thereon, the program code comprising code for causing a first vehicle to receive, from a second vehicle, first sensing information associated with a first object; code for causing the first vehicle to detect sensor data associated with a second object; and code for causing the first vehicle to transmit second sensing information associated with the second object based on at least the sensor data, the first sensing information, and a transmission latency budget for the second sensing information.

The computer-readable further includes wherein the first sensing information includes geographical location information of the first object, and wherein the second sensing information includes geographical location information of the second object. The computer-readable further includes wherein the transmission latency budget is based on at least a speed of the second object. The computer-readable medium further includes wherein second sensing information is transmitted as a broadcast transmission. The computer-readable medium further includes code for causing the first vehicle to determine that the second object is different than the first object. The computer-readable medium further includes code for causing the first vehicle to determine that the first object is the same as the second object; and code for causing the first vehicle to determine whether a number of receptions of the first sensing information associated with the first object is less than a pre-determined number of receptions, wherein the second sensing information is transmitted when the number of receptions of the first sensing information is determined to be less than the pre-determined number of receptions. The computer-readable medium further includes code for causing the first vehicle to receive a configuration indicating the pre-determined number of receptions. The computer-readable medium further includes code for causing the first vehicle to contend for a resource in a channel for transmitting the second sensing information. The computer-readable medium further includes wherein the code for contending the resource is further configured to contend for the resource based a remaining time of the transmission latency budget. The computer-readable medium further includes wherein the code for contending the resource is further configured to determine a backoff time duration based on the transmission latency budget. The computer-readable medium further includes wherein the code for contending the resource is further configured to transmit a channel reservation request signal in a first time interval of a subframe to reserve a second time interval of the subframe for transmission of the second sensing information. The computer-readable medium further includes wherein the first sensing information is received in a first portion of a subframe, wherein the first portion is associated with a first distance to the first object, wherein the computer-readable medium further comprises code for causing the first vehicle to process the first sensing information, and wherein the second sensing information is transmitted based on the processed first sensing information. The computer-readable medium further includes code for causing the first vehicle to receive, in a second portion of the subframe, third sensing information associated with a third object, wherein the second portion is associated with a second distance to the third object, wherein the second distance is farther than the first distance, and wherein the second sensing information is transmitted before processing the third sensing information. The computer-readable medium further includes code for causing the first vehicle to receive a configuration indicating resource-to-location mapping information associated with the first portion and the second portion of the subframe. The computer-readable medium further includes wherein the code for detecting the sensor data includes receiving, from a sensor of the first vehicle, the sensor data associated with the second object. The computer-readable medium further includes wherein the sensor includes at least one of a Lidar detector, a radar detector, or a camera.

Embodiments of the present disclosure include an apparatus associated with a first vehicle, comprising means for receiving, from a second vehicle, first sensing information associated with a first object; means for detecting sensor data associated with a second object; and means for transmitting second sensing information associated with the second object based on at least the sensor data, the first sensing information, and a transmission latency budget for the second sensing information.

The apparatus further includes wherein the first sensing information includes geographical location information of the first object, and wherein the second sensing information includes geographical location information of the second object. The apparatus further includes wherein the transmission latency budget is based on at least a speed of the second object. The apparatus further includes wherein second sensing information is transmitted as a broadcast transmission. The apparatus further includes means for determining that the second object is different than the first object. The apparatus further includes means for determining that the first object is the same as the second object; and means for determining whether a number of receptions of the first sensing information associated with the first object is less than a pre-determined number of receptions, wherein the second sensing information is transmitted when the number of receptions of the first sensing information is determined to be less than the pre-determined number of receptions. The apparatus further includes means for receiving a configuration indicating the pre-determined number of receptions. The apparatus further includes means for contending for a resource in a channel for transmitting the second sensing information. The apparatus further includes wherein the means for contending is further configured to contend for the resource based on a remaining time of the transmission latency budget. The apparatus further includes wherein the means for contending is further configured to determine a backoff time duration based on the transmission latency budget. The apparatus further includes wherein the means for contending is further configured to transmit a channel reservation request signal in a first time interval of a subframe to reserve a second time interval of the subframe for transmission of the second sensing information. The apparatus further includes wherein the first sensing information is received in a first portion of a subframe, wherein the first portion is associated with a first distance to the first object, wherein the apparatus further comprises means for processing the first sensing information, and wherein the second sensing information is transmitted based on the processed first sensing information. The apparatus further includes means for receiving, in a second portion of the subframe, third sensing information associated with a third object, wherein the second portion is associated with a second distance to the third object, wherein the second distance is farther than the first distance, and wherein the second sensing information is transmitted before processing the third sensing information. The apparatus further includes means for receiving a configuration indicating resource-to-location mapping information associated with the first portion and the second portion of the subframe. The apparatus further includes wherein the means for detecting is further configured to sense, by a sensor of the first vehicle, the sensor data associated with the second object. The apparatus further includes wherein the sensor includes at least one of a Lidar detector, a radar detector, or a camera.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    receiving, by a first vehicle from a second vehicle, first sensing information associated with a first object;
    detecting, by the first vehicle, sensor data associated with a second object;
    determining second sensing information associated with the second object based on at least one of the sensor data or the first sensing information;
    determining, by the first vehicle, a transmission time for transmitting the second sensing information, the determination of the transmission time being based on at least a transmission latency budget that includes a time duration during which the second sensing information associated with the second object is within an accuracy limit; and
    transmitting, by the first vehicle during the transmission time, the second sensing information.

2. The method of claim 1, wherein the first sensing information includes geographical location information of the first object, and wherein the second sensing information includes geographical location information of the second object.

3. The method of claim 1, further comprising determining the transmission latency budget based on at least a speed of the second object.

4. The method of claim 1, further comprising transmitting the second sensing information by broadcasting the second sensing information.

5. The method of claim 1, further comprising determining, by the first vehicle, that the second object is different than the first object.

6. The method of claim 1, further comprising:
    determining, by the first vehicle, that the first object is the same as the second object;
    determining, by the first vehicle, whether a number of receptions of the first sensing information associated with the first object is less than a pre-determined number of receptions; and
    transmitting the second sensing information when the number of receptions of the first sensing information is determined to be less than the pre-determined number of receptions.

7. The method of claim 6, further comprising receiving, by the first vehicle, a configuration indicating the pre-determined number of receptions.

8. The method of claim 1, further comprising contending for a resource in a channel for transmitting the second sensing information.

9. The method of claim 8, further comprising contending for the resource based on a remaining time of the transmission latency budget.

10. The method of claim 8, further comprising contending for the resource by determining a backoff time duration based on the transmission latency budget.

11. The method of claim 8, further comprising contending for the resource by transmitting a channel reservation request signal in a first time interval of a subframe to reserve a second time interval of the subframe for transmission of the second sensing information.

12. The method of claim 1, further comprising:
    receiving the first sensing information in a first portion of a subframe, wherein the first portion is associated with a first distance to the first object;
    processing, by the first vehicle, the first sensing information; and
    transmitting the second sensing information based on the processing.

13. The method of claim 12, further comprising:
    receiving, by the first vehicle in a second portion of the subframe, third sensing information associated with a third object, wherein the second portion is associated with a second distance to the third object, and wherein the second distance is farther than the first distance; and
    transmitting the second sensing information before processing the third sensing information.

14. The method of claim 13, further comprising receiving, by the first vehicle, a configuration indicating resource-to-location mapping information associated with the first portion and the second portion of the subframe.

15. The method of claim 1, further comprising detecting the sensor data by sensing, by a sensor of the first vehicle, the sensor data associated with the second object, wherein the sensor includes at least one of a Lidar detector, a radar detector, or a camera.

16. An apparatus associated with a first vehicle, comprising:
    a receiver configured to receive, from a second vehicle, first sensing information associated with a first object;
    a sensor configured to detect sensor data associated with a second object;
    a processor configured to:
        determine second sensing information associated with the second object based on at least one of the sensor data or the first sensing information; and
        determine a transmission time for transmitting the second sensing information, the determination of the transmission time being based on at least a transmission latency budget that includes a time duration during which the second sensing information associated with the second object is within an accuracy limit; and
    a transmitter configured to transmit the second sensing information.

17. The apparatus of claim 16, wherein the first sensing information includes geographical location information of the first object, and wherein the second sensing information includes geographical location information of the second object.

18. The apparatus of claim 16, wherein the transmission latency budget is based on at least a speed of the second object.

19. The apparatus of claim 16, wherein second sensing information is transmitted as a broadcast transmission.

20. The apparatus of claim 16, wherein the processor is further configured to: determine that the second object is different than the first object.

21. The apparatus of claim 16, wherein the processor is further configured to:
determine that the first object is the same as the second object; and
determine whether a number of receptions of the first sensing information associated with the first object is less than a pre-determined number of receptions,
wherein the second sensing information is transmitted when the number of receptions of the first sensing information is determined to be less than the pre-determined number of receptions.

22. The apparatus of claim 21, wherein the receiver is further configured to receive a configuration indicating the pre-determined number of receptions.

23. The apparatus of claim 16, wherein the processor is further configured to contend for a resource in a channel for transmitting the second sensing information.

24. The apparatus of claim 23, wherein the processor is further configured to contend for the resource based on a remaining time of the transmission latency budget.

25. The apparatus of claim 23, wherein the processor is further configured to contend for the resource by determining a backoff time duration based on the transmission latency budget.

26. The apparatus of claim 23, wherein the processor is further configured to contend for the resource by transmitting, via the transmitter, a channel reservation request signal in a first time interval of a subframe to reserve a second time interval of the subframe for transmission of the second sensing information.

27. The apparatus of claim 16, wherein the first sensing information is received in a first portion of a subframe, wherein the first portion is associated with a first distance to the first object, wherein the processor is further configured to process the first sensing information, and wherein the second sensing information is transmitted based on the processing.

28. The apparatus of claim 27, wherein the receiver is further configured to receive, in a second portion of the subframe, third sensing information associated with a third object, wherein the second portion is associated with a second distance to the third object, wherein the second distance is farther than the first distance, and wherein the second sensing information is transmitted before processing the third sensing information.

29. The apparatus of claim 28, wherein the receiver is further configured to receive a configuration indicating resource-to-location mapping information associated with the first portion and the second portion of the subframe.

30. The apparatus of claim 16, wherein the sensor includes at least one of a Lidar detector, a radar detector, or a camera.

* * * * *